United States Patent
Migliarelli

(10) Patent No.: US 8,786,160 B2
(45) Date of Patent: Jul. 22, 2014

(54) BRUSH HOLDER FOR AN ELECTRIC MOTOR

(75) Inventor: Massimiliano Migliarelli, Turin (IT)

(73) Assignee: Gate S.R.L., Turin (IT)

( * ) Notice: Subject to any disclaimer, the term of this patent is extended or adjusted under 35 U.S.C. 154(b) by 469 days.

(21) Appl. No.: 13/250,434

(22) Filed: Sep. 30, 2011

(65) Prior Publication Data

US 2012/0080962 A1 Apr. 5, 2012

(30) Foreign Application Priority Data

Oct. 1, 2010 (IT) .............................. TO2010A0802

(51) Int. Cl.
*H02K 13/14* (2006.01)

(52) U.S. Cl.
USPC ........................................ 310/239; 310/68 C

(58) Field of Classification Search
USPC ........ 310/238, 239, 245–249, 68 C, 219–221
IPC ............................................ H02K 13/14,13/00
See application file for complete search history.

(56) References Cited

U.S. PATENT DOCUMENTS

| | | | | |
|---|---|---|---|---|
| 2,437,973 | A | * | 3/1948 | Schmitz ............................ 318/6 |
| 3,200,278 | A | * | 8/1965 | Krestel ......................... 310/225 |
| 5,949,173 | A | * | 9/1999 | Wille et al. ................... 310/220 |
| 7,696,665 | B2 | | 4/2010 | Cavallo et al. |
| 2002/0096949 | A1 | * | 7/2002 | Yagi et al. ................... 310/68 C |

* cited by examiner

*Primary Examiner* — Dang Le
(74) *Attorney, Agent, or Firm* — Muncy, Geissler, Olds & Lowe, P.C.

(57) ABSTRACT

A brush holder for an electrical motor has an electrically insulating support structure supporting a number of brushes. The support structure has a molded-plastic body incorporating conducting elements forming conductive paths for connecting the brushes to a power supply. A discontinuity is provided in one of the connection paths. A resiliently deformable and electrically conductive strip is connected across the discontinuity with a substantially permanent connection at one end and a heat-meltable connection at the other, with a resilient pre-load tending to break the heat-meltable connection. A voltage drop resistor is provided for operating the motor at a reduced speed. One terminal of the resistor is connected to one side of the discontinuity via a thermally and electrically conducting connection.

11 Claims, 3 Drawing Sheets

BRUSH HOLDER FOR AN ELECTRIC MOTOR

CROSS REFERENCE TO RELATED APPLICATIONS

This non-provisional patent application claims priority under 35 U.S.C. §119(a) from Patent Application No. TO2010A000802 filed in Italy on Oct. 1, 2010.

FIELD OF THE INVENTION

This invention relates to a brush holder for an electric motor and in particular, to a brush holder having a thermal safety device.

BACKGROUND OF THE INVENTION

More specifically the invention relates to a brush-holder of the type comprising: an electrically insulating support structure having an opening for receiving the commutator, around which retaining and guiding cages are fixed, each cage having, translatably mounted therein, a respective positive or negative brush, one end of which is intended to bear during operation against the commutator; the support structure comprising a molded-plastic body incorporating a first and a second conducting element intended to be connected to the positive and negative terminals, respectively, of an external supply-voltage source and connected to the positive and negative brush or brushes, respectively, via a first and a second connection path, respectively, so as to allow the brushes to be coupled to said voltage source; a discontinuity being provided in one of said connection paths; a resiliently deformable and electrically conducting strip being connected mechanically and electrically across said discontinuity with a substantially permanent connection at one end and with a heat-meltable connection at the other end and with a resilient pre-load tending to break the connection at said other end. Such a connection provides a thermal safely device protecting the motor from an excessive temperature rise which may result in the motor catching on fire A brush-holder of the abovementioned type forms the subject of U.S. Pat. No. 7,696,665 in the name of the present Applicant/Assignee.

An object of the present invention is to provide an improved brush holder of the aforementioned type.

While such a brush holder works well with a single speed motor, when used in a two speed motor the thermal safety device may not operate sufficiently quickly to avoid an excessive temperature rise when the motor is operating on low speed.

SUMMARY OF THE INVENTION

Hence there is a desire for an improved brush holder with a thermal safety device which is reliable when the motor is operating in either the high speed or low speed mode.

This is achieved in the present invention by using a brush holder of the aforementioned type, in which the brush holder also has a voltage drop resistor having one terminal connected to the aforementioned first conducting element via a thermally and electrically conducting connection; and the aforementioned discontinuity is formed between said first conducting element and a further, adjacent, conducting element along the aforementioned first connection path, so that said strip is connected between said first conducting element and said further conducting element.

The brush holder according to the invention is therefore provided with two circuits, for operation of the associated electric motor at low speed and at high speed respectively. The voltage drop resistor forms part of the circuit for low-speed operation.

Accordingly, in one aspect thereof, the present invention provides a brush holder for an electrical motor having a commutator, comprising: an electrically insulating support structure having a opening for receiving the commutator, around which retaining and guiding cages are fixed, each cage having, translatably mounted therein, a respective positive or negative brush, one end of which is intended to bear during operation against the commutator; the support structure comprising a molded-plastic body incorporating at least one first and one second conducting element intended to be connected to the positive and negative terminals, respectively, of an external supply-voltage source and connected to the positive and negative brush or brushes, respectively, via a first and a second connection path so as to allow the brushes to be coupled to the voltage source; a discontinuity being provided in one of the connection paths; and a resiliently deformable and electrically conducting strip being connected mechanically and electrically across the discontinuity with a substantially permanent connection at one end and with a heat-meltable connection at the other end and with a resilient pre-load tending to break the connection at the other end; wherein the brush holder further comprises a voltage drop resistor for operation of the motor at a reduced speed, having one terminal connected to the first conducting element via a thermally and electrically conducting connection.

Preferably, the other terminal of the aforementioned voltage drop resistor is accessible from the outside via a second electrically and thermally conducting connection.

Preferably, the first thermally and electrically conducting connection is formed by an enameled or tin-plated copper wire.

Preferably, the first conducting element and the second conducting element are connected to the power source by a first cable and a second cable respectively, the first cable and the second cable forming a single multipolar cable with the second connection of the voltage drop resistor.

Preferably, the heat-meltable connection is formed by means of soldering with a high-temperature tin alloy.

Preferably, the tin alloy has a melting point ranging from 240° C. to 290° C.

Preferably, at least one through-hole is formed in the other end of the strip for gripping the tin alloy.

Preferably, a first induction coil and a second induction coil are connected in series to the first connection path and the second connection path respectively.

Preferably, the first induction coil is connected between a third conducting element and an adjacent fourth conducting element along the first connection path.

Preferably, the first connection path and the second connection path is shorted by a capacitor, one terminal of the capacitor being connected to the first conducting element of the first connection path.

Preferably, the discontinuity is formed between the first conducting element and an adjacent third conducting element along said first connection path, so that the strip is connected between the first conducting element and the third conducting element.

In the brush-holder according to the present invention a single strip with a heat-meltable connection ensures that the associated motor is reliably protected against damage which may be caused by overcurrents of any origin, for example due to rotor jamming, by over voltages or by overloads, which tend to produce an anomalous increase in the temperature of the electrical motor and its components.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear.

Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
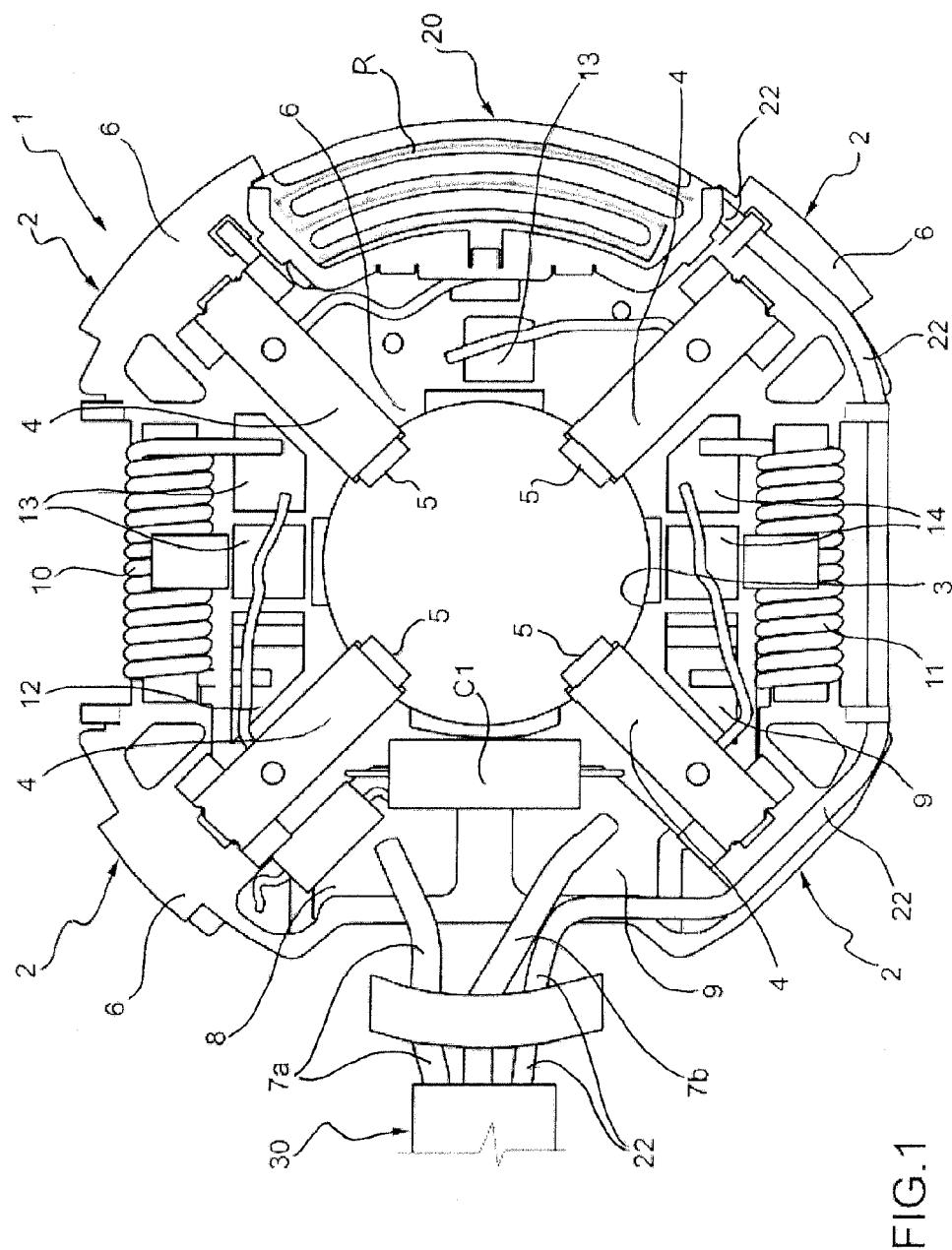
FIG. 1 is a front view of a brush-holder according to the present invention.
Figure 2:
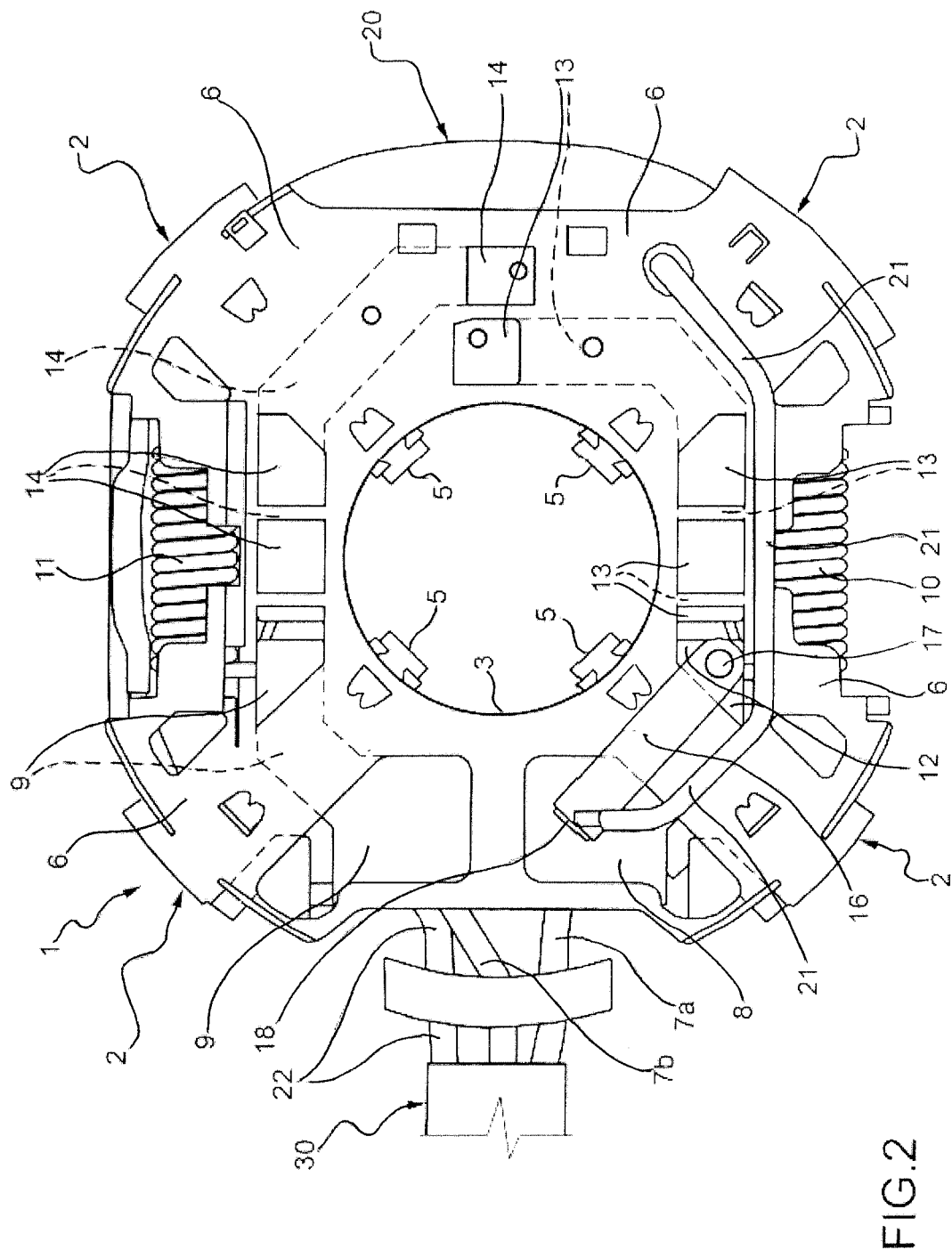
FIG. 2 is a rear view of the brush-holder according to FIG. 1.

With reference to the drawings, and in particular to FIGS. 1 and 2, in one preferred embodiment a brush holder 1 for an electric motor, comprises a support structure 2 with a substantially annular shape.

This support structure 2 has a opening 3 through which, in the assembled condition of the brush holder 1 ready for use, the commutator of the electrical motor extends rotatably.

As can be seen in particular in FIG. 1, retaining and guiding cages 4 are fixed around the opening 3 on one side of the support structure 2, a respective brush 5 being mounted in an axially translatable manner inside each of said cages.

Figure 3:
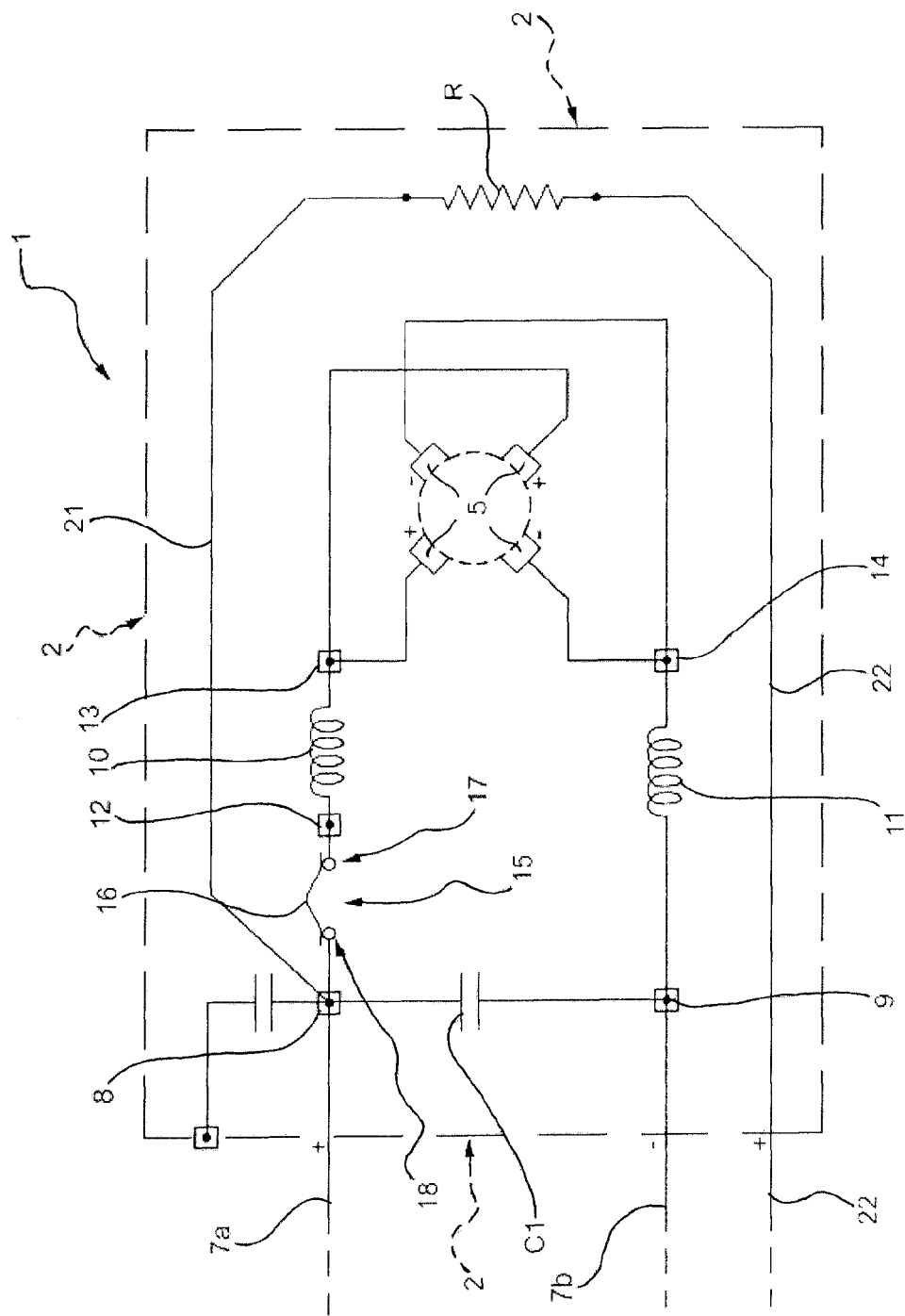
FIG. 3 is a schematic circuit diagram of the brush-holder according to FIGS. 1 and 2.

In the embodiment shown by way of example, the brush holder 1 is intended to be used in an electrical motor of the four-pole commutator type and has two pairs of respectively positive and negative brushes, facing each other in pairs, as shown in the schematic diagram of FIG. 3, where the positive brushes are indicated by a "+" sign, while the negative brushes are indicated by a "−" sign. During operation, in a manner known per se, the radially innermost ends of the brushes 5 bear against the essentially cylindrical side surface of the commutator.

The invention is moreover not limited to a brush holder with four brushes, but is also applicable to a brush holder which has, for example, a single positive brush and a single negative brush.

The support structure 2 essentially comprises a molded-plastic body 6 incorporating in the molding essentially rigid conducting elements, which are connected between the respective positive and negative brushes 5, and associated connection means, such as the insulated electrical conductors 7a and 7b, which are intended to allow the brushes 5 to be coupled to the positive and negative terminals, respectively, of an external supply-voltage source (not shown).

In the example shown in FIGS. 1 and 2 the terminals of the conductors 7a and 7b are soldered in a stable, i.e. permanent, manner to portions of a first and second plate-like conducting element 8 and 9, respectively, which are exposed within the overmolded plastic body 6. With reference to FIGS. 1 and 3, a capacitor C1 is connected between these conducting elements 8 and 9.

In the embodiment shown the brush holder 1 also has two induction coils or chokes 10 and 11 which are connected in series with the positive and negative brushes, respectively, for attenuating radiated interference (see also FIG. 3).

Correspondingly, the molded-plastic body 6 incorporates in the molding further essentially rigid, plate-like interconnecting conducting elements which are denoted by 12, 13 and 14 in FIGS. 2 and 3.

Obviously, in a brush holder with a simpler structure, and in particular without the induction coils 10 and 11, the plastic body 6 could incorporate a smaller number of connecting conduction elements.

Overall, the conducting elements 8-14 define two connection paths for the positive brush or brushes and the negative brush or brushes, respectively.

With reference to FIGS. 2 and 3, a discontinuity, denoted by 15 in FIG. 3, is provided in one of these connection paths. In the embodiment shown this discontinuity 15 is formed between the conducting elements 8 and 12 (which incidentally may be regarded as being two separate portions of a same conducting element).

As shown in FIGS. 2 and 3, a resiliently deformable strip 16 made of electrically conducting material is connected mechanically and electrically across the discontinuity 15, with a substantially permanent connection 17 at one end and with a heat-meltable connection 18 at its other end. The connection 17 is formed for example by means of electric welding of one end of the strip 16 to the connecting conduction element 12.

The heat-meltable connection 18 is instead formed for example by means of soldering with a high-temperature tin alloy, for example with a melting point ranging from 240° C. to 290° C. In this preferred embodiment, the melting point of the tin alloy is at about 250° C. The end of the tin-soldered strip 16 may be provided optionally with at least one through-hole intended to ensure a better "grip" of the tin alloy.

Conveniently, the strip 16 is fastened at its end by means of the connections 17 and 18 so that it is resiliently pre-loaded, in particular with a pre-load which tends to break said connections, and in particular the heat-meltable connection 18.

With reference to the drawings, the brush holder 1 also has a voltage drop resistor R forming part of a circuit for operation of the associated electric motor at a low speed. In the example of the embodiment shown the resistor R is formed with a portion of electrically resistive wire, for example a portion of ISA-CHROM wire, provided in a coiled arrangement inside a support 20 made of electrically insulating material, for example ceramic material (see in particular FIG. 1).

One terminal of the resistor R is connected to the conducting element 8 by means of a portion of electrically and thermally conducting wire 21 (FIGS. 2 and 3). This wire is for example an enameled or tin-plated copper wire of appropriate cross-section.

The other terminal of the resistor R is connected to a further portion of wire 22 which is similar to the wire 21 and which is conveniently associated with the cables 7a and 7b so as form a single multipolar cable denoted by 30 in FIGS. 1 and 2.

During high-speed operation, when there is a sudden increase in the power consumption of the electric motor with which the brush holder 1 is associated, said increase being caused for example by jamming of the rotor or by an over voltage or an overload, a rapid increase in the temperature of the various components occurs, including the conducting elements 8-14 incorporated in the body 6 of the brush holder and the strip 16. If the temperature reaches and/or exceeds for a predetermined period of time the melting temperature of the heat-meltable connection 18, the corresponding end of the strip 16 separates from the conducting element 8 of the brush holder and, as a result of its resilient pre-load, moves away from it, interrupting instantaneously the circuit. In this way the motor is rapidly and effectively protected, avoiding in particular, the risk of a fire.

The protection is also operative should the increase in the temperature and/or current (due for example to jamming of the rotor, an over voltage or an overload) occur while the circuit for low speed operation including the resistor R is operative. In this case the heat generated by the Joule effect in this resistor is "conveyed" towards the conducting element 8 via the portion of electrically and thermally conductive wire 21. The heat thus conveyed helps break the heat-meltable connection between the strip 16 and the conducting element 8, causing in this case also, interruption of the circuit.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. Brush holder for an electrical motor having a commutator, comprising:
    an electrically insulating support structure having a opening for receiving the commutator, around which retaining and guiding cages are fixed, each cage having, translatably mounted therein, a respective positive or negative brush, one end of which is intended to bear during operation against the commutator;
    the support structure comprising a molded-plastic body incorporating at least one first and one second conducting element intended to be connected to the positive and negative terminals, respectively, of an external supply-voltage source and connected to the positive and negative brush or brushes, respectively, via a first and a second connection path so as to allow the brushes to be coupled to said voltage source;
    a discontinuity being provided in one of said connection paths; and
    a resiliently deformable and electrically conducting strip being connected mechanically and electrically across said discontinuity with a substantially permanent connection at one end and with a heat-meltable connection at the other end and with a resilient pre-load tending to break the connection at said other end;
    wherein the brush holder further comprises a voltage drop resistor for operation of the motor at a reduced speed, having one terminal connected to said first conducting element via a thermally and electrically conducting connection.

2. The brush holder of claim 1, wherein the other terminal of the aforementioned voltage drop resistor is accessible from the outside via a second electrically and thermally conducting connection.

3. The brush holder of claim 2, wherein the first conducting element and the second conducting element are connected to the power source by a first cable and a second cable respectively, the first cable and the second cable forming a single multipolar cable with the second connection of the voltage drop resistor.

4. The brush holder of claim 1, wherein the first thermally and electrically conducting connection is formed by an enameled or tin-plated copper wire.

5. The brush holder of claim 1, wherein the heat-meltable connection is formed by means of soldering with a high-temperature tin alloy.

6. The brush holder of claim 5, wherein the tin alloy has a melting point ranging from 240° C. to 290° C.

7. The brush holder of claim 5, wherein at least one through-hole is formed in the other end of the strip for gripping the tin alloy.

8. The brush holder of claim 1, wherein a first induction coil and a second induction coil are connected in series to the first connection path and the second connection path respectively.

9. The brush holder of claim 8, wherein the first induction coil is connected between a third conducting element and an adjacent fourth conducting element along the first connection path.

10. The brush holder of claim 1, wherein the first connection path and the second connection path is shorted by a capacitor, one terminal of the capacitor being connected to the first conducting element of the first connection path.

11. The brush holder of claim 1, wherein said discontinuity is formed between said first conducting element and an adjacent third conducting element along said first connection path, so that the strip is connected between said first conducting element and said third conducting element.

* * * * *